May 12, 1953 R. F. URSO ET AL 2,638,582
INDICATING CHECK VALVE
Filed May 10, 1950
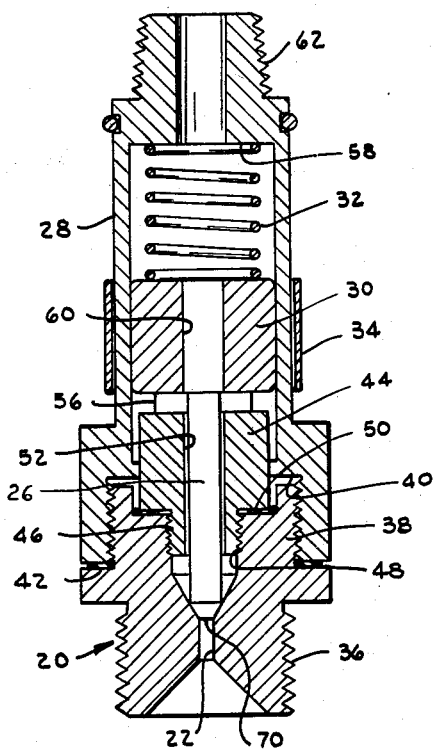
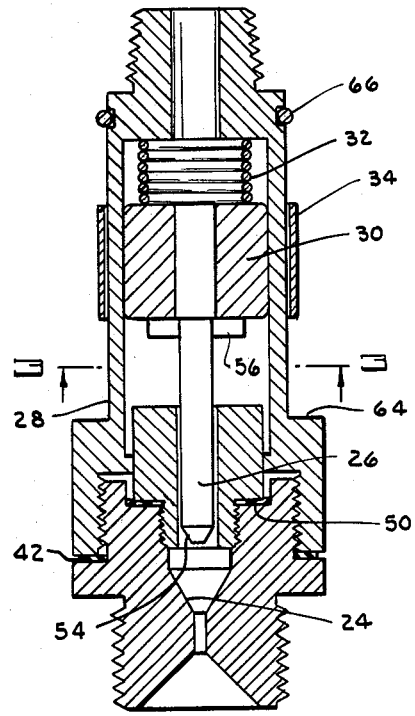
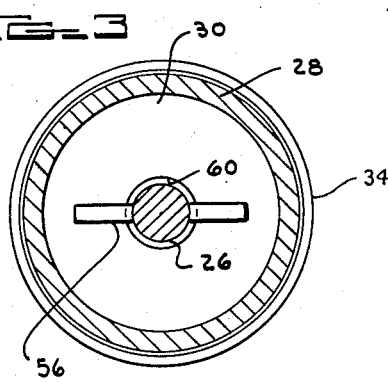
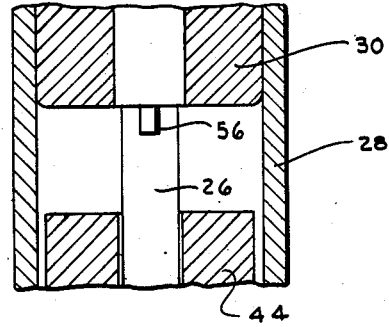
INVENTOR.
RALPH F. URSO
ALFRED W. GARDES
BY EDWARD L. CARLETON
ATTORNEY Patented May 12, 1953

2,638,582

UNITED STATES PATENT OFFICE 2,638,582

INDICATING CHECK VALVE

Ralph F. Urso, Grosse Pointe, Alfred W. Gardes, Detroit, and Edward L. Carleton, Wyandotte, Mich., assignors to McCord Corporation, Detroit, Mich., a corporation of Maine Application May 10, 1950, Serial No. 161,184

2 Claims. (Cl. 340—282)

1

This invention relates to indicating check valves and has particular reference to an indicating check valve which is adapted for use in a lubrication system in the feed line between the feed pump and a bearing so as to indicate that lubricant is being supplied through the line past the valve from the pump to the bearing.

A principal object of the invention is to provide a device of the character referred to which functions not only as a check valve but as an indicator.

Another object of the invention is to provide a device of the character referred to which may be used with high pressure systems.

Another object of the invention is to provide a device of the character referred to which is simple in construction and dependable in operation and which is of such a nature that the indicator thereof may be conveniently observed when the check valve is installed.

Other and further objects of the invention will be apparent from the following description and claims and may be understood by reference to the accompanying drawing, of which there is one sheet, which by way of illustration shows a preferred embodiment of the invention and what we now consider to be the best mode in which we have contemplated applying the principles of our invention. Other embodiments of the invention may be used without departing from the scope of the present invention as set forth in the appended claims.

In the drawing:

Fig. 1 is a longitudinal sectional view of a valve embodying the invention with the valve shown in its closed position;

Fig. 2 is a view similar to Fig. 1, showing the valve in its open position;

Fig. 3 is a sectional view taken on the line 3—3 of Fig. 2; and

Fig. 4 is an enlarged fragmentary sectional view of the valve, taken at right angles to Fig. 2.

An indicating check valve of the type disclosed is particularly adapted for use in lubricating systems between the feed pump and the bearing so as to prevent return flow of lubricant from the bearing to the pump upon the retractile stroke of the pump. Such valve comprises in general a body 20 having a passage 22 therethrough and a conical valve seat 24 around the passage, a movable valve member 26, a casing 28 of non-magnetic material detachably connected to the body and providing a continuation of the passage, a magnet 30, a coil spring 32, and an indicator member 34 of magnetic material disposed externally of the casing 28 and within magnetic relation of the magnet 30.

2

The body 20 at one end is provided with a threaded portion 36 for connection by means of a coupling to the lubricator pump. The other end portion 38 of the body is threaded into a socket 40 formed in one end of the casing 28. A gasket 42 is secured between adjacent portions of the body 20 and the casing 28. A bushing 44 is provided with a threaded extension 46 which is threadedly secured in a threaded opening 48 in the body 20, and a gasket 50 is secured between the bushing 44 and the body 20. The bushing 44 is provided with a cylindrical bore 52 which forms a guide for the valve member 26, the valve member 26 comprising a pin having a frusto-conical end 54 which cooperates with the valve seat 24 when the parts are arranged as illustrated in Fig. 1 to close the passage 22. The bore 52 forms a continuation of the passage 22. The diameter of the bore 52 is slightly greater than that of the shank of the valve member 26 so as to permit lubricant to flow through the bore 52 between the shank of the valve member 26 and the bore 52. The clearance shown is somewhat exaggerated for illustration purposes. The valve member 26 has a T head 56.

The magnet 30 preferably comprises an annulus of permanent magnetic material of the type now commonly in use and is slidably arranged within the casing 28. The coil spring 32 confined between an end wall 58 of the casing and the magnet 30 reacts on the valve member 26 so as to bias the same toward its closed position as shown in Fig. 1. The bore 60 through the magnet forms a continuation of the passage, as does the space within the casing 28. The end 62 of the casing 28 is threaded for attachment to a coupling or bearing.

The indicator member 34 comprises a sleeve of magnetic material which has a loose fit on the casing 28 and is freely movable between the shoulder 64 thereon and the snap ring 66 which is arranged in a groove in one end of the casing. The indicator 34 is disposed in the field of the magnet 30 so as to move therewith, although it is not mechanically connected therewith.

As previously indicated, the spring 32 moves the valve member 26 to its closed position as shown in Fig. 1 at the end of the discharge stroke of the pump or upon the retractile stroke thereof. The pressure of the lubricant against the end 70 of the valve member 26 when the valve is in its closed position as indicated in Fig. 1 during the discharge stroke of the pump will cause the valve 26 to move to the position shown in Fig. 2, thereby moving the magnet 30 and the sleeve indicator member 34. This movement of the indicator 34 will indicate to an observer that the valve is opening to permit the passage of lubricant. After the discharge stoke, the spring 32 will close the valve and return the magnet 30 and the sleeve 34 to the position as shown in Fig. 1, and this movement of the sleeve 34 will indicate to an observer that the valve is closing after the discharge stroke of the pump. The indicator member 34 thus not only will indicate the opening and closing of the valve, but also the flow of lubricant through the valve, since flow of lubricant is necessary in order to move the valve from its closed to its open position.

While we have illustrated and described a preferred embodiment of our invention, it is understood that this is capable of modification and we therefore do not wish to be limited to the precise details set forth but desire to avail ourselves of such changes and alterations as fall within the purview of the following claims.

We claim:

1. In a check valve or the like including a casing of non-magnetic material having a fluid flow passage therethrough and a valve part movable within said casing in response to opening and closing of said valve, indicating means for indicating the opening and closing of said valve comprising a magnetized member slidably arranged within said casing and movable with said valve part, and an indicator member comprising a ring of magnetic material slidably disposed about said casing and within magnetic relation of said magnetized member so as to move therewith in response to opening and closing of said valve.

2. Indicating means according to claim 1 wherein said magnetized member has an opening therethrough forming a part of the fluid flow passage through said valve.

RALPH F. URSO.
ALFRED W. GARDES.
EDWARD L. CARLETON.

References Cited in the file of this patent

UNITED STATES PATENTS

| Number | Name | Date |
|---|---|---|
| 482,171 | Guasco et al. | Sept. 6, 1892 |
| 530,592 | Kleritj | Dec. 11, 1894 |
| 986,210 | Pearson | Mar. 7, 1911 |
| 2,029,633 | Muhleisen | Feb. 4, 1936 |
| 2,260,516 | Gerber | Oct. 28, 1941 |